United States Patent
Ghneim et al.

(10) Patent No.: US 9,896,130 B2
(45) Date of Patent: Feb. 20, 2018

(54) GUIDANCE SYSTEM FOR A VEHICLE REVERSING A TRAILER ALONG AN INTENDED BACKING PATH

(71) Applicant: Ford Global Technologies, LLC, Dearborn, MI (US)

(72) Inventors: Maher Ghneim, Plymouth, MI (US); Yasmin Jawad, Dearborn Heights, MI (US); Marcus McKinney, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/851,767

(22) Filed: Sep. 11, 2015

(65) Prior Publication Data
US 2017/0073005 A1    Mar. 16, 2017

(51) Int. Cl.
*G08B 21/00*    (2006.01)
*B62D 15/02*    (2006.01)
*B62D 13/06*    (2006.01)

(52) U.S. Cl.
CPC .......... *B62D 15/029* (2013.01); *B62D 13/06* (2013.01)

(58) Field of Classification Search
CPC ........ B62D 15/029; B62D 13/00; B62D 1/06; B62D 1/62; B62D 15/0275; B62D 13/06; B62D 15/027; B62D 9/002; B62D 11/08; B60R 1/00; B60R 2300/808; B60R 2300/8086; G05D 1/0088; B60W 30/045; B60W 10/18; B60W 10/20; B60T 8/1755; B60T 11/21; B60T 2230/06; B60T 2230/08; B60T 2260/02; Y10T 477/80

USPC ..................... 340/431, 425.5, 435, 436, 440
See application file for complete search history.

(56) References Cited

U.S. PATENT DOCUMENTS

| | | |
|---|---|---|
| 3,605,088 A | 9/1971 | Savelli |
| 3,833,928 A | 9/1974 | Gavit et al. |
| 3,924,257 A | 12/1975 | Roberts |
| 4,044,706 A | 8/1977 | Gill |
| 4,430,637 A | 2/1984 | Koch-Ducker et al. |
| 4,846,094 A | 7/1989 | Woods |
| 4,848,499 A | 7/1989 | Martinet et al. |
| 4,897,642 A | 1/1990 | DiLullo et al. |
| 4,947,097 A | 8/1990 | Tao |
| 5,097,250 A | 3/1992 | Hernandez |

(Continued)

FOREIGN PATENT DOCUMENTS

| | | |
|---|---|---|
| CN | 101610420 A | 12/2009 |
| CN | 101833869 A | 9/2010 |

(Continued)

OTHER PUBLICATIONS

"Ford Super Duty: Truck Technology", Brochure, www.media.ford.com, Sep. 2011, pp. 1-2.

(Continued)

*Primary Examiner* — Anh V La
(74) *Attorney, Agent, or Firm* — Raymond Coppiellie; Price Heneveld LLP

(57) ABSTRACT

A guidance system for a vehicle reversing a trailer is provided. The system includes a display and a controller configured to generate a steering icon on the display. The steering icon recommends a steering direction and a steering magnitude related to a steering device of the vehicle in order to correct a deviation from an intended backing path.

20 Claims, 4 Drawing Sheets

(56) References Cited

U.S. PATENT DOCUMENTS

| | | |
|---|---|---|
| 5,132,851 A | 7/1992 | Bomar et al. |
| 5,155,683 A | 10/1992 | Rahim |
| 5,191,328 A | 3/1993 | Nelson |
| 5,235,316 A | 8/1993 | Qualizza |
| 5,247,442 A | 9/1993 | Kendall |
| 5,455,557 A | 10/1995 | Noll et al. |
| 5,461,357 A | 10/1995 | Yoshioka et al. |
| 5,650,764 A | 7/1997 | McCullough |
| 5,690,347 A | 11/1997 | Juergens et al. |
| 5,734,336 A | 3/1998 | Smithline |
| 5,781,662 A | 7/1998 | Mori et al. |
| 5,905,433 A | 5/1999 | Wortham |
| 5,951,035 A | 9/1999 | Phillips, Jr. et al. |
| 5,957,232 A | 9/1999 | Shimizu et al. |
| 5,999,091 A | 12/1999 | Wortham |
| 6,041,582 A | 3/2000 | Tiede et al. |
| 6,100,795 A | 8/2000 | Otterbacher et al. |
| 6,178,650 B1 | 1/2001 | Thibodeaux |
| 6,182,010 B1 | 1/2001 | Berstis |
| 6,198,992 B1 | 3/2001 | Winslow |
| 6,226,226 B1 | 5/2001 | Lill et al. |
| 6,351,698 B1 | 2/2002 | Kubota et al. |
| 6,366,202 B1 | 4/2002 | Rosenthal |
| 6,411,898 B2 | 6/2002 | Ishida et al. |
| 6,434,486 B1 | 8/2002 | Studt et al. |
| 6,480,104 B1 | 11/2002 | Wall et al. |
| 6,483,429 B1 | 11/2002 | Yasui et al. |
| 6,526,335 B1 | 2/2003 | Treyz et al. |
| 6,539,288 B2 | 3/2003 | Ishida et al. |
| 6,573,833 B1 | 6/2003 | Rosenthal |
| 6,577,952 B2 | 6/2003 | Geier et al. |
| 6,580,984 B2 | 6/2003 | Fecher et al. |
| 6,604,592 B2 | 8/2003 | Pietsch et al. |
| 6,643,576 B1 | 11/2003 | O Connor et al. |
| 6,683,539 B2 | 1/2004 | Trajkovic et al. |
| 6,801,125 B1 | 10/2004 | McGregor et al. |
| 6,816,765 B2 | 11/2004 | Yamamoto et al. |
| 6,837,432 B2 | 1/2005 | Tsikos et al. |
| 6,847,916 B1 | 1/2005 | Ying |
| 6,857,494 B2 | 2/2005 | Kobayashi et al. |
| 6,933,837 B2 | 8/2005 | Gunderson et al. |
| 6,959,970 B2 | 11/2005 | Tseng |
| 6,970,184 B2 | 11/2005 | Hirama et al. |
| 6,989,739 B2 | 1/2006 | Li |
| 7,005,974 B2 | 2/2006 | McMahon et al. |
| 7,026,957 B2 | 4/2006 | Rubenstein |
| 7,047,117 B2 | 5/2006 | Akiyama et al. |
| 7,085,634 B2 | 8/2006 | Endo et al. |
| 7,089,101 B2 | 8/2006 | Fischer et al. |
| 7,136,754 B2 | 11/2006 | Hahn et al. |
| 7,142,098 B2 | 11/2006 | Lang et al. |
| 7,154,385 B2 | 12/2006 | Lee et al. |
| 7,161,616 B1 | 1/2007 | Okamoto et al. |
| 7,175,194 B2 | 2/2007 | Ball |
| 7,204,504 B2 | 4/2007 | Gehring et al. |
| 7,207,041 B2 | 4/2007 | Elson et al. |
| 7,220,217 B2 | 5/2007 | Tamai et al. |
| 7,225,891 B2 | 6/2007 | Gehring et al. |
| 7,229,139 B2 | 6/2007 | Lu et al. |
| 7,239,958 B2 | 7/2007 | Grougan et al. |
| 7,266,435 B2 | 9/2007 | Wang et al. |
| 7,309,075 B2 | 12/2007 | Ramsey et al. |
| 7,319,927 B1 | 1/2008 | Sun et al. |
| 7,352,388 B2 | 4/2008 | Miwa et al. |
| 7,353,110 B2 | 4/2008 | Kim |
| 7,366,892 B2 | 4/2008 | Spaur et al. |
| 7,401,871 B2 | 7/2008 | Lu et al. |
| 7,425,889 B2 | 9/2008 | Widmann et al. |
| 7,451,020 B2 | 11/2008 | Goetting et al. |
| 7,463,137 B2 | 12/2008 | Wishart et al. |
| 7,505,784 B2 | 3/2009 | Barbera |
| 7,537,256 B2 | 5/2009 | Gates et al. |
| 7,552,009 B2 | 6/2009 | Nelson |
| 7,602,782 B2 | 10/2009 | Doviak et al. |
| 7,623,952 B2 | 11/2009 | Unruh et al. |
| 7,640,180 B1 | 12/2009 | Shimizu et al. |
| 7,689,253 B2 | 3/2010 | Basir |
| 7,690,737 B2 | 4/2010 | Lu |
| 7,692,557 B2 | 4/2010 | Medina et al. |
| 7,693,661 B2 | 4/2010 | Iwasaka |
| 7,715,953 B2 | 5/2010 | Shepard |
| 7,777,615 B2 | 8/2010 | Okuda et al. |
| 7,783,699 B2 | 8/2010 | Rasin et al. |
| 7,786,849 B2 | 8/2010 | Buckley |
| 7,801,941 B2 | 9/2010 | Conneely et al. |
| 7,825,782 B2 | 11/2010 | Hermann |
| 7,827,047 B2 | 11/2010 | Anderson et al. |
| 7,840,347 B2 | 11/2010 | Noguchi |
| 7,904,222 B2 | 3/2011 | Lee et al. |
| 7,907,975 B2 | 3/2011 | Sakamoto et al. |
| 7,917,081 B2 | 3/2011 | Voto et al. |
| 7,932,623 B2 | 4/2011 | Burlak et al. |
| 7,932,815 B2 | 4/2011 | Martinez et al. |
| 7,950,751 B2 | 5/2011 | Offerle et al. |
| 7,969,326 B2 | 6/2011 | Sakakibara |
| 7,974,444 B2 | 7/2011 | Hongo |
| 8,009,025 B2 | 8/2011 | Engstrom et al. |
| 8,010,252 B2 | 8/2011 | Getman et al. |
| 8,019,592 B2 | 9/2011 | Fukuoka et al. |
| 8,024,743 B2 | 9/2011 | Werner |
| 8,033,955 B2 | 10/2011 | FarNsworth |
| 8,036,792 B2 | 10/2011 | Dechamp |
| 8,037,500 B2 | 10/2011 | Margis et al. |
| 8,038,166 B1 | 10/2011 | Piesinger |
| 8,044,776 B2 | 10/2011 | Schofield et al. |
| 8,044,779 B2 | 10/2011 | Hahn et al. |
| 8,121,802 B2 | 2/2012 | Grider et al. |
| 8,131,458 B1 | 3/2012 | Zilka |
| 8,138,899 B2 | 3/2012 | Ghneim |
| 8,140,138 B2 | 3/2012 | Chrumka |
| 8,150,474 B2 | 4/2012 | Saito et al. |
| 8,165,770 B2 | 4/2012 | Getman et al. |
| 8,169,341 B2 | 5/2012 | Toledo et al. |
| 8,174,576 B2 | 5/2012 | Akatsuka et al. |
| 8,179,238 B2 | 5/2012 | Roberts, Sr. et al. |
| 8,195,145 B2 | 6/2012 | Angelhag |
| 8,205,704 B2 | 6/2012 | Kadowaki et al. |
| 8,244,442 B2 | 8/2012 | Craig et al. |
| 8,245,270 B2 | 8/2012 | Cooperstein et al. |
| 8,255,007 B2 | 8/2012 | Saito et al. |
| 8,267,485 B2 | 9/2012 | Barlsen et al. |
| 8,270,933 B2 | 9/2012 | Riemer et al. |
| 8,280,607 B2 | 10/2012 | Gatti et al. |
| 8,308,182 B2 | 11/2012 | Ortmann et al. |
| 8,310,353 B2 | 11/2012 | Hinninger et al. |
| 8,315,617 B2 | 11/2012 | Tadayon et al. |
| 8,319,618 B2 | 11/2012 | Gomi et al. |
| 8,319,663 B2 | 11/2012 | Von Reyher et al. |
| 8,352,575 B2 | 1/2013 | Samaha |
| 8,362,888 B2 | 1/2013 | Roberts, Sr. et al. |
| 8,370,056 B2 | 2/2013 | Trombley et al. |
| 8,374,749 B2 | 2/2013 | Tanaka |
| 8,380,416 B2 | 2/2013 | Offerle et al. |
| 8,392,066 B2 | 3/2013 | Ehara et al. |
| 8,401,744 B2 | 3/2013 | Chiocco |
| 8,406,956 B2 | 3/2013 | Wey et al. |
| 8,417,263 B2 | 4/2013 | Jenkins et al. |
| 8,417,417 B2 | 4/2013 | Chen et al. |
| 8,417,444 B2 | 4/2013 | Smid et al. |
| 8,427,288 B2 | 4/2013 | Schofield et al. |
| 8,451,107 B2 | 5/2013 | Lu et al. |
| 8,471,691 B2 | 6/2013 | Zhang et al. |
| 8,473,575 B2 | 6/2013 | Marchwicki et al. |
| 8,494,439 B2 | 7/2013 | Faenger |
| 8,498,757 B2 | 7/2013 | Bowden et al. |
| 8,538,785 B2 | 9/2013 | Coleman et al. |
| 8,548,680 B2 | 10/2013 | Ryerson et al. |
| 8,560,175 B2 | 10/2013 | Bammert et al. |
| 8,571,758 B2 | 10/2013 | Klier et al. |
| 8,626,382 B2 | 1/2014 | Obradovich |
| 8,755,984 B2 | 6/2014 | Rupp et al. |
| 8,786,417 B2 | 7/2014 | Holmen et al. |
| 8,788,204 B2 | 7/2014 | Shimizu |
| 8,797,190 B2 | 8/2014 | Kolbe et al. |

(56) References Cited

U.S. PATENT DOCUMENTS

| | | |
|---|---|---|
| 8,798,860 B2 | 8/2014 | Dechamp |
| 8,807,261 B2 | 8/2014 | Subrt et al. |
| 8,823,796 B2 | 9/2014 | Shen et al. |
| 8,825,221 B2 | 9/2014 | Hueger et al. |
| 8,868,329 B2 | 10/2014 | Ikeda et al. |
| 8,888,120 B2 | 11/2014 | Trevino |
| 8,892,360 B2 | 11/2014 | Otani |
| 8,909,426 B2 | 12/2014 | Rhode et al. |
| 8,928,757 B2 | 1/2015 | Maekawa et al. |
| 8,930,140 B2 | 1/2015 | Trombley et al. |
| 9,008,913 B1 | 4/2015 | Sears et al. |
| 9,013,286 B2 | 4/2015 | Chen et al. |
| 9,042,603 B2 | 5/2015 | Elwart et al. |
| 9,082,315 B2 | 7/2015 | Lin et al. |
| 9,094,583 B2 | 7/2015 | Shih et al. |
| 9,102,271 B2 | 8/2015 | Trombley et al. |
| 9,114,832 B2 | 8/2015 | Wang et al. |
| 9,120,359 B2 | 9/2015 | Chiu et al. |
| 9,132,856 B2 | 9/2015 | Shepard |
| 9,208,686 B2 | 12/2015 | Takamatsu |
| 9,227,474 B2 | 1/2016 | Liu |
| 9,238,483 B2 | 1/2016 | Hafner et al. |
| 9,248,858 B2 | 2/2016 | Lavoie et al. |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,352,777 B2 | 5/2016 | Lavoie et al. |
| 9,434,414 B2 | 9/2016 | Lavoie |
| 9,499,018 B2 | 11/2016 | Gehrke et al. |
| 9,500,497 B2 | 11/2016 | Lavoie et al. |
| 9,508,189 B2 | 11/2016 | Han et al. |
| 9,623,904 B2 | 4/2017 | Lavoie et al. |
| 9,676,377 B2 | 6/2017 | Hafner et al. |
| 2002/0005780 A1 | 1/2002 | Ehrlich et al. |
| 2002/0098853 A1 | 7/2002 | Chrumka |
| 2002/0111118 A1 | 8/2002 | Klitsner et al. |
| 2003/0079123 A1 | 4/2003 | Mas Ribes |
| 2003/0147534 A1 | 8/2003 | Ablay et al. |
| 2003/0222982 A1 | 12/2003 | Hamdan et al. |
| 2003/0234512 A1 | 12/2003 | Holub |
| 2004/0119822 A1 | 6/2004 | Custer et al. |
| 2004/0203660 A1 | 10/2004 | Tibrewal et al. |
| 2004/0207525 A1 | 10/2004 | Wholey et al. |
| 2004/0260438 A1 | 12/2004 | Chernetsky et al. |
| 2005/0000738 A1 | 1/2005 | Gehring et al. |
| 2005/0073433 A1 | 4/2005 | Gunderson et al. |
| 2005/0074143 A1 | 4/2005 | Kawai |
| 2005/0091408 A1 | 4/2005 | Parupudi et al. |
| 2005/0128059 A1 | 6/2005 | Vause |
| 2005/0137784 A1 | 6/2005 | Grougan et al. |
| 2005/0146607 A1 | 7/2005 | Linn et al. |
| 2005/0168331 A1 | 8/2005 | Gunderson |
| 2005/0177635 A1 | 8/2005 | Schmidt et al. |
| 2005/0206225 A1 | 9/2005 | Offerle et al. |
| 2005/0206231 A1 | 9/2005 | Lu et al. |
| 2005/0206299 A1 | 9/2005 | Nakamura et al. |
| 2005/0236201 A1 | 10/2005 | Spannheimer et al. |
| 2005/0236896 A1 | 10/2005 | Offede et al. |
| 2006/0071447 A1 | 4/2006 | Gehring et al. |
| 2006/0076828 A1 | 4/2006 | Lu et al. |
| 2006/0092129 A1 | 5/2006 | Choquet et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0156315 A1 | 7/2006 | Wood et al. |
| 2006/0190097 A1 | 8/2006 | Rubenstein |
| 2006/0190147 A1 | 8/2006 | Lee et al. |
| 2006/0238538 A1 | 10/2006 | Kapler et al. |
| 2006/0244579 A1 | 11/2006 | Raab |
| 2006/0250501 A1 | 11/2006 | Widmann et al. |
| 2006/0276959 A1 | 12/2006 | Matsuoka et al. |
| 2006/0287821 A1 | 12/2006 | Lin |
| 2006/0293800 A1 | 12/2006 | Bauer et al. |
| 2007/0027581 A1 | 2/2007 | Bauer et al. |
| 2007/0057816 A1 | 3/2007 | Sakakibara et al. |
| 2007/0132560 A1 | 6/2007 | Nystrom et al. |
| 2007/0132573 A1 | 6/2007 | Quach et al. |
| 2007/0198190 A1 | 8/2007 | Bauer et al. |
| 2007/0216136 A1 | 9/2007 | Dietz |
| 2007/0260395 A1 | 11/2007 | Matsuoka et al. |
| 2008/0027599 A1 | 1/2008 | Logan et al. |
| 2008/0027635 A1 | 1/2008 | Tengler et al. |
| 2008/0148374 A1 | 6/2008 | Spaur et al. |
| 2008/0177443 A1 | 7/2008 | Lee et al. |
| 2008/0180526 A1 | 7/2008 | Trevino |
| 2008/0186384 A1 | 8/2008 | Ishii et al. |
| 2008/0231701 A1 | 9/2008 | Greenwood et al. |
| 2008/0312792 A1 | 12/2008 | Dechamp |
| 2008/0313050 A1 | 12/2008 | Basir |
| 2009/0005932 A1 | 1/2009 | Lee et al. |
| 2009/0045924 A1 | 2/2009 | Roberts, Sr. et al. |
| 2009/0063053 A1 | 3/2009 | Basson et al. |
| 2009/0075624 A1 | 3/2009 | Cox et al. |
| 2009/0079828 A1 | 3/2009 | Lee et al. |
| 2009/0082935 A1 | 3/2009 | Leschuk et al. |
| 2009/0093928 A1 | 4/2009 | Getman et al. |
| 2009/0106036 A1 | 4/2009 | Tamura et al. |
| 2009/0117890 A1 | 5/2009 | Jacobsen et al. |
| 2009/0140064 A1 | 6/2009 | Schultz et al. |
| 2009/0219147 A1 | 9/2009 | Bradley et al. |
| 2009/0253466 A1 | 10/2009 | Saito et al. |
| 2009/0271078 A1 | 10/2009 | Dickinson |
| 2009/0306854 A1 | 12/2009 | Dechamp |
| 2009/0318119 A1 | 12/2009 | Basir et al. |
| 2010/0060739 A1 | 3/2010 | Salazar |
| 2010/0063670 A1 | 3/2010 | Brzezinski et al. |
| 2010/0098853 A1 | 4/2010 | Hoffmann et al. |
| 2010/0114471 A1 | 5/2010 | Sugiyama et al. |
| 2010/0152989 A1 | 6/2010 | Smith et al. |
| 2010/0156671 A1 | 6/2010 | Lee et al. |
| 2010/0157061 A1 | 6/2010 | Katsman et al. |
| 2010/0171828 A1 | 7/2010 | Ishii |
| 2010/0174422 A1 | 7/2010 | Jacobsen et al. |
| 2010/0191421 A1 | 7/2010 | Nilsson |
| 2010/0198491 A1 | 8/2010 | Mays |
| 2010/0222964 A1 | 9/2010 | Dechamp |
| 2010/0234071 A1 | 9/2010 | Shabtay et al. |
| 2010/0305815 A1 | 12/2010 | Trueman et al. |
| 2010/0306309 A1 | 12/2010 | Santori et al. |
| 2010/0324770 A1 | 12/2010 | Ramsey et al. |
| 2011/0001825 A1 | 1/2011 | Hahn |
| 2011/0022282 A1 | 1/2011 | Wu et al. |
| 2011/0025482 A1 | 2/2011 | Alguera et al. |
| 2011/0063425 A1 | 3/2011 | Tieman |
| 2011/0088659 A1 | 4/2011 | Wang et al. |
| 2011/0102583 A1 | 5/2011 | Kinzalow |
| 2011/0110530 A1 | 5/2011 | Kimura |
| 2011/0112721 A1 | 5/2011 | Wang et al. |
| 2011/0112762 A1 | 5/2011 | Gruijters et al. |
| 2011/0125457 A1 | 5/2011 | Lee et al. |
| 2011/0129093 A1 | 6/2011 | Karam et al. |
| 2011/0140872 A1 | 6/2011 | McClure |
| 2011/0149077 A1 | 6/2011 | Robert |
| 2011/0153198 A1 | 6/2011 | Kokkas et al. |
| 2011/0160956 A1 | 6/2011 | Chung et al. |
| 2011/0181457 A1 | 7/2011 | Basten |
| 2011/0185390 A1 | 7/2011 | Faenger et al. |
| 2011/0195659 A1 | 8/2011 | Boll et al. |
| 2011/0216199 A1 | 9/2011 | Trevino et al. |
| 2011/0257860 A1 | 10/2011 | Getman et al. |
| 2011/0281522 A1 | 11/2011 | Suda |
| 2011/0296037 A1 | 12/2011 | Westra et al. |
| 2012/0004805 A1 | 1/2012 | Gray et al. |
| 2012/0062743 A1 | 3/2012 | Lynam et al. |
| 2012/0062744 A1 | 3/2012 | Schofield et al. |
| 2012/0065815 A1 | 3/2012 | Hess |
| 2012/0079002 A1 | 3/2012 | Boll et al. |
| 2012/0084292 A1 | 4/2012 | Liang et al. |
| 2012/0086808 A1 | 4/2012 | Lynam et al. |
| 2012/0095649 A1 | 4/2012 | Klier et al. |
| 2012/0185131 A1 | 7/2012 | Headley |
| 2012/0191285 A1 | 7/2012 | Woolf et al. |
| 2012/0200706 A1 | 8/2012 | Greenwood et al. |
| 2012/0224059 A1 | 9/2012 | Takamatsu |

(56) References Cited

U.S. PATENT DOCUMENTS

| | | |
|---|---|---|
| 2012/0265416 A1 | 10/2012 | Lu et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0288156 A1 | 11/2012 | Kido |
| 2012/0290150 A1 | 11/2012 | Doughty et al. |
| 2012/0314073 A1 | 12/2012 | Shimoda et al. |
| 2012/0316732 A1 | 12/2012 | Auer |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0038436 A1 | 2/2013 | Brey et al. |
| 2013/0041524 A1 | 2/2013 | Brey |
| 2013/0057397 A1 | 3/2013 | Cutler et al. |
| 2013/0076007 A1 | 3/2013 | Goode et al. |
| 2013/0120161 A1 | 5/2013 | Wakabayashi et al. |
| 2013/0148748 A1 | 6/2013 | Suda |
| 2013/0158803 A1 | 6/2013 | Headley |
| 2013/0158863 A1 | 6/2013 | Skvarce et al. |
| 2013/0226390 A1 | 8/2013 | Luo et al. |
| 2013/0250114 A1 | 9/2013 | Lu |
| 2013/0253814 A1 | 9/2013 | Wirthlin |
| 2013/0268160 A1 | 10/2013 | Trombley et al. |
| 2014/0005918 A1 | 1/2014 | Qiang |
| 2014/0012465 A1 | 1/2014 | Shank et al. |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0074743 A1 | 3/2014 | Rademaker |
| 2014/0085472 A1 | 3/2014 | Lu et al. |
| 2014/0088797 A1 | 3/2014 | McClain et al. |
| 2014/0088824 A1 | 3/2014 | Ishimoto |
| 2014/0121883 A1 | 5/2014 | Shen et al. |
| 2014/0121930 A1 | 5/2014 | Allexi et al. |
| 2014/0125795 A1 | 5/2014 | Yerke |
| 2014/0156148 A1 | 6/2014 | Kikuchi |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0267727 A1 | 9/2014 | Alaniz |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie et al. |
| 2014/0343795 A1 | 11/2014 | Lavoie |
| 2014/0358429 A1 | 12/2014 | Shutko et al. |
| 2014/0361955 A1 | 12/2014 | Goncalves |
| 2014/0379217 A1 | 12/2014 | Rupp et al. |
| 2015/0002670 A1 | 1/2015 | Bajpai |
| 2015/0057903 A1 | 2/2015 | Rhode et al. |
| 2015/0066296 A1 | 3/2015 | Trombley et al. |
| 2015/0094945 A1 | 4/2015 | Cheng et al. |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0142211 A1 | 5/2015 | Shehata et al. |
| 2015/0149040 A1* | 5/2015 | Hueger ............... B62D 13/06 701/41 |
| 2015/0158527 A1 | 6/2015 | Hafner et al. |
| 2015/0165850 A1 | 6/2015 | Chiu et al. |
| 2015/0179075 A1 | 6/2015 | Lee |
| 2015/0197278 A1 | 7/2015 | Boos et al. |
| 2015/0203156 A1 | 7/2015 | Hafner et al. |
| 2015/0210317 A1 | 7/2015 | Hafner et al. |
| 2015/0217692 A1 | 8/2015 | Yanagawa |
| 2015/0217693 A1 | 8/2015 | Pliefke et al. |
| 2015/0232031 A1 | 8/2015 | Kitaura et al. |
| 2015/0232092 A1 | 8/2015 | Fairgrieve et al. |
| 2015/0234386 A1 | 8/2015 | Zini et al. |
| 2015/0344028 A1 | 12/2015 | Gieseke et al. |
| 2016/0023601 A1* | 1/2016 | Windeler ............... B60R 1/00 348/118 |
| 2016/0039456 A1 | 2/2016 | Lavoie et al. |
| 2016/0059780 A1 | 3/2016 | Lavoie |
| 2016/0059888 A1 | 3/2016 | Bradley et al. |
| 2016/0096549 A1 | 4/2016 | Herzog et al. |
| 2016/0129939 A1 | 5/2016 | Singh et al. |
| 2016/0152263 A1 | 6/2016 | Singh et al. |
| 2016/0280267 A1 | 9/2016 | Lavoie et al. |
| 2016/0304122 A1 | 10/2016 | Herzog et al. |
| 2017/0073005 A1 | 3/2017 | Ghneim et al. |

FOREIGN PATENT DOCUMENTS

| | | |
|---|---|---|
| CN | 202541524 U | 11/2012 |
| DE | 3931518 A1 | 4/1991 |
| DE | 9208595 U1 | 8/1992 |
| DE | 10065230 A1 | 7/2002 |
| DE | 10154612 A1 | 5/2003 |
| DE | 102005043466 A1 | 3/2007 |
| DE | 102005043467 A1 | 3/2007 |
| DE | 102005043468 A1 | 3/2007 |
| DE | 102006035021 | 1/2008 |
| DE | 102006048947 A1 | 4/2008 |
| DE | 102008020838 A1 | 11/2008 |
| DE | 102009012253 A1 | 9/2010 |
| DE | 102010004920 A1 | 7/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102011108440 A1 | 1/2013 |
| DE | 102013000198 A1 | 7/2014 |
| EP | 0418653 A1 | 3/1991 |
| EP | 0849144 A2 | 6/1998 |
| EP | 1361543 A2 | 11/2003 |
| EP | 1695888 A2 | 8/2006 |
| EP | 1593552 B1 | 3/2007 |
| EP | 2168815 A1 | 3/2010 |
| EP | 2199188 A2 | 6/2010 |
| EP | 2452549 A1 | 5/2012 |
| EP | 2551132 A1 | 1/2013 |
| EP | 2644477 A1 | 10/2013 |
| EP | 1569073 B1 | 9/2014 |
| EP | 2803944 A2 | 11/2014 |
| FR | 2515379 A1 | 10/1981 |
| FR | 2606717 A1 | 5/1988 |
| FR | 2716145 A1 | 8/1995 |
| FR | 2786456 A1 | 6/2000 |
| FR | 2980750 A1 | 4/2013 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 63-085568 | 6/1988 |
| JP | 06-028598 A | 4/1994 |
| JP | 2003148938 A | 5/2003 |
| JP | 2003175852 A | 6/2003 |
| JP | 2004114879 A | 4/2004 |
| JP | 3716722 B2 | 11/2005 |
| JP | 2008027138 A | 2/2008 |
| JP | 2008123028 A | 5/2008 |
| JP | 2009171122 A | 7/2009 |

(56) References Cited

FOREIGN PATENT DOCUMENTS

| | | | |
|---|---|---|---|
| JP | 2012166647 A | 9/2012 | |
| JP | 2014034289 A | 2/2014 | |
| KR | 20060012710 A | 2/2006 | |
| KR | 20060133750 A | 12/2006 | |
| KR | 20110114897 A | 10/2011 | |
| KR | 20140105199 A | 9/2014 | |
| TW | 200930010 A | 7/2009 | |
| WO | 3503263 A1 | 8/1985 | |
| WO | 2011117372 A1 | 9/2011 | |
| WO | 2014019730 A1 | 2/2014 | |
| WO | 2014037500 A1 | 3/2014 | |
| WO | 2014123575 A1 | 8/2014 | |
| WO | 2015074027 A1 | 5/2015 | |

OTHER PUBLICATIONS

"Ford Guide to Towing", Trailer Life, Magazine, 2012, pp. 1-38.
"Dodge Dart: The Hot Compact Car", Brochure, www.dart-mouth.com/enginerring-development.html, pp. 1-6; date unknown.
M. Wagner, D. Zoebel, and A. Meroth, "Adaptive Software and Systems Architecture for Driver Assistance Systems" International Journal of Machine Learning and Computing, Oct. 2011, vol. 1, No. 4, pp. 359-365.
Christian Lundquist, Wolfgang Reinelt, Olof Enqvist, "Back Driving Assistant for Passenger Cars with Trailer", SAE Int'l, ZF Lenksysteme Gmbh, Schwaebisch Gmuend, Germany, 2006, pp. 1-8.
"Understanding Tractor-Trailer Performance", Caterpillar, 2006, pp. 1-28.
Divelbiss, A.W.; Wen, J.T.; "Trajectory Tracking Control of a Car-Trailer System", IEEE, Control Systems Technology, Aug. 6, 2002, vol. 5, No. 3, ISSN: 1063-6536, pp. 269-278.
Stahn, R.; Heiserich, G.; Stopp, A., "Laser Scanner-Based Navigation for Commercial Vehicles", IEEE, Intelligent Vehicles Symposium, Jun. 2007, pp. 969-974, print ISBN: 1931-0587.
Widrow, B.; Lamego, M.M., "Neurointerfaces: Applications", IEEE, Adaptive Systems for Signal Processing, Communications, and Control Symposium, Oct. 2000, pp. 441-444.
Dieter Zoebel, David Polock, Philipp Wojke, "Steering Assistance for Backing Up Articulated Vehicles", Systemics, Cybernetics and Informatics, Universitaet Koblenz-Landau, Germany, vol. 1, No. 5, pp. 101-106; date unknown.
Stephen K. Young, Carol A. Eberhard, Philip J. Moffa, "Development of Performance Specifications for Collision Avoidance Systems for Lane Change, Merging and Backing", TRW Space and Electronics Group, Feb. 1995, pp. 1-31.
Ford Motor Company, "09 F-150", Brochure, www.fordvehicles.com, pp. 1-30; date unknown.
Michael Paine, "Heavy Vehicle Object Detection Systems", Vehicle Design and Research Pty Lmited for VicRoads, Jun. 2003, pp. 1-22.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.
"2012 Edge—Trailer Towing Selector", Brochure, Preliminary 2012 RV & Trailer Towing Guide Information, pp. 1-3.
"Meritor Wabco Reverse Detection Module for Trailers with 12-Volt Constant Power Systems", Technical Bulletin, TP-02172, Revised Oct. 2004, pp. 1-8.
Simonoff, Adam J., "USH0001469 Remotely Piloted Vehicle Control and Interface System", Aug. 1, 1995, pp. 1-7.
"Range Rover Evoque's Surround Camera System"; MSN Douglas Newcomb Jun. 15, 2012, pp. 1-2.
"Electronic Trailer Steering", VSE, Advanced Steering & Suspension Solutions, Brochure, 2009, The Netherlands, pp. 1-28.
"WABCO Electronic Braking System—New Generation", Vehicle Control Systems—An American Standard Company, www.wabco-auto.com, 2004, pp. 1-8.
T. Wang, "Reverse-A-Matic-Wheel Direction Sensor System Operation and Installation Manual", Dec. 15, 2005, pp. 1-9.
"Wireless-Enabled Microphone, Speaker and User Interface for a Vehicle", The IP.com, Aug. 26, 2004, pp. 1-5, IP.com disclosure No. IPCOM000030782D.
"RFID Read/Write Module", Grand Idea Studio, 2013, pp. 1-3, website, http://www.grandideastudio.com/portfolio/rfid-read-write-module/.
Laszlo Palkovics, Pal Michelberger, Jozsef Bokor, Peter Gaspar, "Adaptive Identification for Heavy-Truck Stability Control", Vehicle Systems Dynamics Supplement, vol. 25, No. sup1, 1996, pp. 502-518.
"Convenience and Loadspace Features" Jaguar Land Rover Limited, 2012, pp. 1-15, http://www.landrover.com/us/en/r/all-new-range-rover/explore/.
"Delphi Lane Departure Warning", Delphi Corporation, Troy, Michigan pp. 1-2; date unknown.
Micah Steele, R. Brent Gillespie, "Shared Control Between Human and Machine: Using a Haptic Steering Wheel to Aid in Land Vehicle Guidance", University of Michigan, pp. 1-5; date unknown.
"Electric Power Steering", Toyota Hybrid System Diagnosis-Course 072, Section 7, pp. 1-10; date unknown.
"Telematics Past, Present, and Future," Automotive Service Association, www.ASAshop.org, May 2008, 20 pgs.
"Fully Automatic Trailer Tow Hitch With LIN Bus," https://webista.bmw.com/webista/show?d=1860575499&lang=engb&print=1, pp. 1-5; date unknown.
Nüsser, René; Pelz, Rodolfo Mann, "Bluetooth-based Wireless Connectivity in an Automotive Environment", VTC, 2000, pp. 1935-1942.
Whitfield, Kermit, "A Hitchhiker's Guide to the Telematics Ecosystem", Automotive Design & Production, Oct. 1, 2003, 3 pgs.
Niarasimhan, N.; Janssen, C.; Pearce, M.; Song, Y., "A Lightweight Remote Display Management Protocol for Mobile Devices", 2007, IEEE, pp. 711-715.
Microsoft, Navigation System, Sync Powered by Microsoft, Ford Motor Company, Jul. 2007, 164 pgs.
Microsoft, Supplemental Guide, Sync Powered by Microsoft, Ford Motor Company, Nov. 2007, 86 pgs.
Voelcker, J., "Top 10 Tech Cars: It's the Environment, Stupid", IEEE Spectrum, Apr. 2008, pp. 26-35.
Microsoft, Navigation System, Sync Powered by Microsoft, Ford Motor Company, Oct. 2008, 194 pgs.
Microsoft, Supplemental Guide, Sync Powered by Microsoft, Ford Motor Company, Oct. 2008, 83 pgs.
Chantry, Darryl, "Mapping Applications to the Cloud", Microsoft Corporation, Jan. 2009, 20 pgs.
Yarden, Raam; Surage Jr., Chris; Kim, Chong Il; Doboli, Alex; Voisan, Emil; Purcaru, Constantin, "TUKI: A Voice-Activated Information Browser", 2009, IEEE, pp. 1-5.
Gil-Castiñeira, Felipe; Chaves-Diéguez, David; González-Castaño, Francisco J., "Integration of Nomadic Devices with Automotive User Interfaces", IEEE Transactions on Consumer Electronics, Feb. 2009, vol. 55, Issue 1, pp. 34-41.
Microsoft, Navigation System, Sync Powered by Microsoft, Ford Motor Company, Jul. 2009, 196 pgs.
Microsoft, Supplemental Guide, Sync Powered by Microsoft, Ford Motor Company, Aug. 2009, 87 pgs.
Goodwin, Antuan, "Ford Unveils Open-Source Sync Developer Platform", The Car Tech Blog, Oct. 29, 2009, 5 pgs. [Retrieved from http://reviews.cnet.com/8301-13746_7-10385619-48.html on Feb. 15, 2011].
Lamberti, Ralf, "Full Circle: The Rise of Vehicle-Installed Telematics",Telematics Munich, Nov. 10, 2009, 12 pgs.
"Apple Files Patent Which Could Allow You to Control Your Computer Remotely Using iPhone", Dec. 18, 2009, 7 pgs [Retrieved from www.iphonehacks.com on Jun. 22, 2010].
Newmark, Zack, "Student develop in-car cloud computing apps; envision the future of in-car connectivity", May 4, 2010, 3 pgs [Retrieved from www.worldcarfans.com on Jun. 18, 2010].
"Service Discovery Protocol (SDP)", Palo Wireless Bluetooth Resource Center, 7 pgs [Retrieved from http://palowireless.com/infotooth/tutorial/sdp.asp on Aug. 3, 2010].
Sonnenberg, Jan, "Service and User Interface Transfer from Nomadic Devices to Car Infotainment Systems", Second Interna-

(56) References Cited

OTHER PUBLICATIONS tional Conference on Automotive User Interfaces and Interactive Vehicular Applications (Automotive UI), Nov. 11-12, 2010, pp. 162-165.
"MobileSafer makes it easy to keep connected and safe", ZoomSafer Inc., 2010, 5 pgs. [Retrieved from http://zoomsafer.com/products/mobilesafer on Dec. 28, 2010].
"PhonEnforcer FAQs", Turnoffthecellphone.com, 3 pgs. [Retrieved from http://turnoffthecellphone.com/faq.html on Dec. 28, 2010].
"How PhonEnforcer Works", Turnoffthecellphone.com, 2 pgs. [Retrieved from http://turnoffthecellphone.com/howitworks.htm on Dec. 28, 2010].
European Patent Office, European Search Report for Application No. EP11151623, dated Feb. 15, 2011, 7 pgs.
Wikipedia, "X Window System", Wikipedia, The Free Encyclopedia, date unknown, 19 pgs. [Retrieved from http://en.wikipedia.org/w/index.php?title=X_Window_System&oldid=639253038].
Jung-Hoon Hwang, Ronald C. Arkin, and Dong-Soo Kwon; "Mobile robots at your fingertip: Bezier curve on-line trajectory generation for supervisory control," IEEE/RSJ, International Conference on Intelligent Robots and Systems, Las Vegas, Nevada, Oct. 2003, 6 pages.
M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

\* cited by examiner

GUIDANCE SYSTEM FOR A VEHICLE REVERSING A TRAILER ALONG AN INTENDED BACKING PATH

FIELD OF THE INVENTION

The present invention generally relates to vehicle guidance systems, and more particularly, to guidance systems for assisting a driver of a vehicle in reversing a trailer along an intended backing path.

BACKGROUND OF THE INVENTION

Reversing a trailer, in a straight line for example, can be especially challenging. Even when the vehicle and trailer are properly aligned, a trailer may move off at an angle during a backing maneuver, thereby causing a deviation from an intended backing path. Thus, there is a need for a guidance system that assists a driver in reversing the trailer by providing easy to follow directions to correct deviations so that the vehicle and trailer can be returned along the intended backing path.

SUMMARY OF THE INVENTION

According to one aspect of the present invention, a guidance system for a vehicle reversing a trailer is provided. The system includes a display and a controller configured to generate a steering icon on the display. The steering icon recommends a steering direction and a steering magnitude related to a steering device of the vehicle in order to correct a deviation from an intended backing path.

According to another aspect of the present invention, a guidance system for a vehicle reversing a trailer is provided. The system includes a display and a controller configured to generate a steering icon on the display to recommend a steering direction and a steering magnitude related to a steering device of the vehicle to correct a deviation from an intended backing path. The steering direction and the steering magnitude are determined at least in part based on a hitch angle between the vehicle and the trailer.

According to yet another aspect of the present invention, a method of reversing a vehicle and trailer along an intended backing path is provided. The method includes the steps of measuring a hitch angle between the vehicle and trailer, determining whether the vehicle and trailer have deviated from the intended backing path based on the measured hitch angle, and making a steering direction and steering magnitude recommendation on a display of the vehicle to correct a deviation from the intended backing path.

These and other aspects, objects, and features of the present invention will be understood and appreciated by those skilled in the art upon studying the following specification, claims, and appended drawings.

DETAILED DESCRIPTION OF THE PREFERRED EMBODIMENTS

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Figure 1:
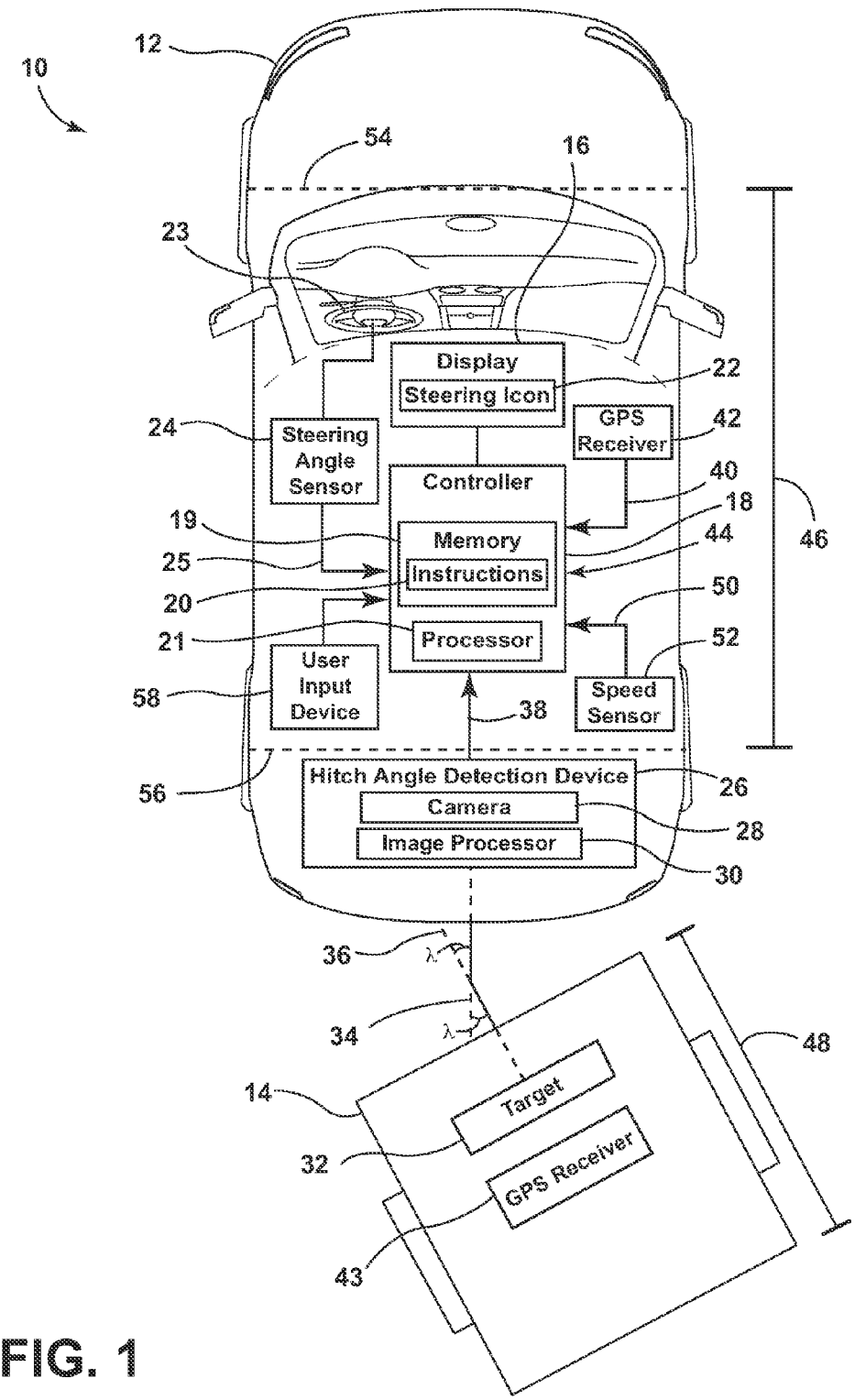
FIG. 1 is a schematic diagram of a guidance system to assist a driver of a vehicle with reversing a trailer attached to the vehicle, according to one embodiment.

Referring to FIG. 1, a guidance system 10 is shown according to one embodiment. The guidance system 10 is used to assist a driver of a vehicle 12 with reversing a trailer 14 attached to the vehicle 12. The guidance system 10 includes a display 16 disposed within the vehicle 12 and in view of the driver. The display 16 may be located in a center console, dashboard, heads up display, rearview mirror, or any other display bearing surface in the front passenger compartment of the vehicle 12. A controller 18 is communicatively coupled with the display 16 and includes a memory 19 having instructions 20 thereon that are executable by a processor 21 for generating visuals on the display 16. In the presently illustrated embodiment, the controller 18 is configured to generate a steering icon 22 on the display 16. As will be described in greater detail below, the steering icon 22 recommends a steering direction and a steering magnitude related to a steering device 23 of the vehicle 12 in order to correct a deviation from an intended backing path. The steering device 23 may include a steering wheel or other device in which the driver can manipulate to effectuate steering of the vehicle 12. The position and rate of return of the steering device 23 may be measured by a steering angle sensor 24. The steering angle sensor 24 outputs steering information 25 including the position and rate of return of the steering device 23 in degrees to the controller 18 so that the controller 18 can monitor the position of steering device 23 to check whether the recommendations made using the steering icon 22 have been adopted by the driver.

To ensure that the steering direction and steering magnitude recommendations are accurate, the controller 18 may communicate with a hitch angle detection device 26 of the vehicle 12. The hitch angle detection device 26 may include a camera 28 configured to image a rear-vehicle scene. The images taken by the camera 28 are analyzed by an image processor 30 that is configured to track the position of a target 32 within the captured images. The target 32 may be an existing structure of the trailer 14 or an object placed on the trailer 14 for the purpose of being detected by the image processor 30. By tracking the position of the target 32, the image processor 30 may calculate a hitch angle λ between the vehicle 12 and the trailer 14. Alternatively, the hitch angle λ may be determined through hitch angle sensors or any other means known in the art. As defined herein, the hitch angle λ corresponds to an angle between a longitudinal axis 34 of the vehicle and a longitudinal axis 36 of the trailer 14. Hitch angle information 38 is sent from the image processor 30 to the controller 18 and the controller 18 may make steering direction and/or steering magnitude recommendations based at least in part on the hitch angle information 38. The controller 18 may also receive positional information 40 related to the vehicle 12 from a global positioning system (GPS) receiver 42 disposed on the vehicle 12. Additionally, another GPS receiver 43 may be disposed on the trailer 14 to wirelessly communicate positional information 44 related to the trailer 14 to the controller 18. It is also contemplated that the controller 18 may take into account vehicle and trailer-related information to increase the accuracy of the recommendations. For example, the controller 18 may make steering direction and/or steering magnitude recommendations based on a wheelbase measurement 46 and a trailer length measurement 48 as both of these characteristics have an impact on the manner in which the vehicle 12 and trailer 14 behave when the steering device 23 is turned. The controller 18 may also take into account a speed 50 at which the vehicle 12 and trailer 14 are moving, which may be measured and inputted to the controller 18 via a speed sensor 52 of the vehicle 12. The wheelbase measurement 46 is defined herein as the distance between the front and rear axles 54, 56 of the vehicle 12 and may be retrieved from the memory 19 of the controller 18. The trailer length measurement 48 may be measured by a driver or other user and inputted to the controller 18 via a user-input device 58. The user-input device 58 may be part of display 16 or elsewhere located in the vehicle 12. Alternatively, the user-input device 58 may include a portable electronic device such as a smartphone, tablet, and the like.

Figure 2:
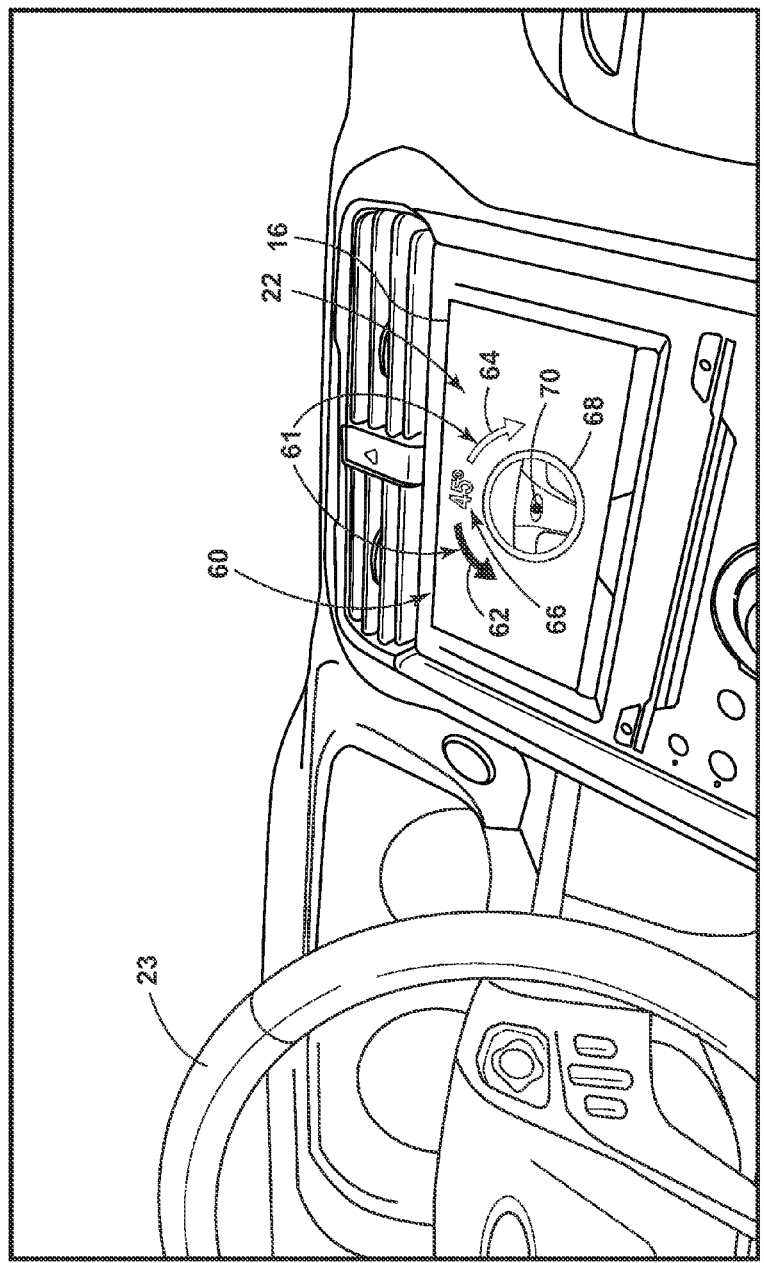
FIG. 2 illustrates a steering icon on a vehicle display for generating recommendations related to a vehicle steering device, according to one embodiment.

Referring to FIG. 2, an exemplary embodiment of the steering icon 22 is shown generated on a display 16 of a center console 60. The display 16 may be a touchscreen display or other conventional display. For purposes of simplicity, only the steering icon 22 is shown on the display 16. However, it should be appreciated that other visuals may appear on the display 16 alongside the steering icon 22. That is, the steering icon 22 may share the display 16 with other visuals related or unrelated to the guidance system 10 described herein. The steering icon 22 includes a directional element 61 shown as arrows 62 and 64 and a magnitude element 66 that may be positioned between arrows 62 and 64 and corresponds to a numerical value measured in degrees. When a vehicle 12 and trailer 14 makes a deviation from an intended backing path, one of the arrows 62, 64 may illuminate to indicate whether to turn the steering device 23 in a counterclockwise or clockwise direction, respectively, whereas the magnitude element 66 indicates how far the steering device 23 should be turned in the recommended direction. For example, in the present embodiment, a recommendation is made to turn the steering device 23 forty-five degrees in a counterclockwise direction. To further assist the driver, the steering icon 22 may also include a relating element 68 to visually relate the current position of the steering device 23 to the recommended steering direction and steering magnitude. The relating element 68 is exemplarily shown in FIG. 2 as a steering wheel graphic that matches the steering device 23 and is configured to turn in accordance with the direction and magnitude specified by the directional element 61 and the magnitude element 66. As an additional feature, the speed at which the steering wheel graphic turns may function as a recommended speed for turning the steering device 23. The use of the relating element 68 provides another means with which to guide the driver back along the intended backing path. Once the driver has turned the steering device 23 in the recommended direction and magnitude, the driver may be notified through the illumination of a hold indicator 70 to maintain the steering device 23 in its current position. Alternatively, one or both of the directional and magnitude elements 61, 66 may make additional recommendations related to a new steering direction and steering magnitude, respectfully, for correcting any remaining deviation(s) from the intended backing path. The hold indicator 70 may be located in the center of the relating element 68 but may be elsewhere located on the display 16 if desired. It is also contemplated that any of the notifications and recommendations described herein may also be delivered to the driver through non-visual means such as auditory, haptic, and the like, provided the vehicle 12 is equipped with such functionality.

Figure 3:
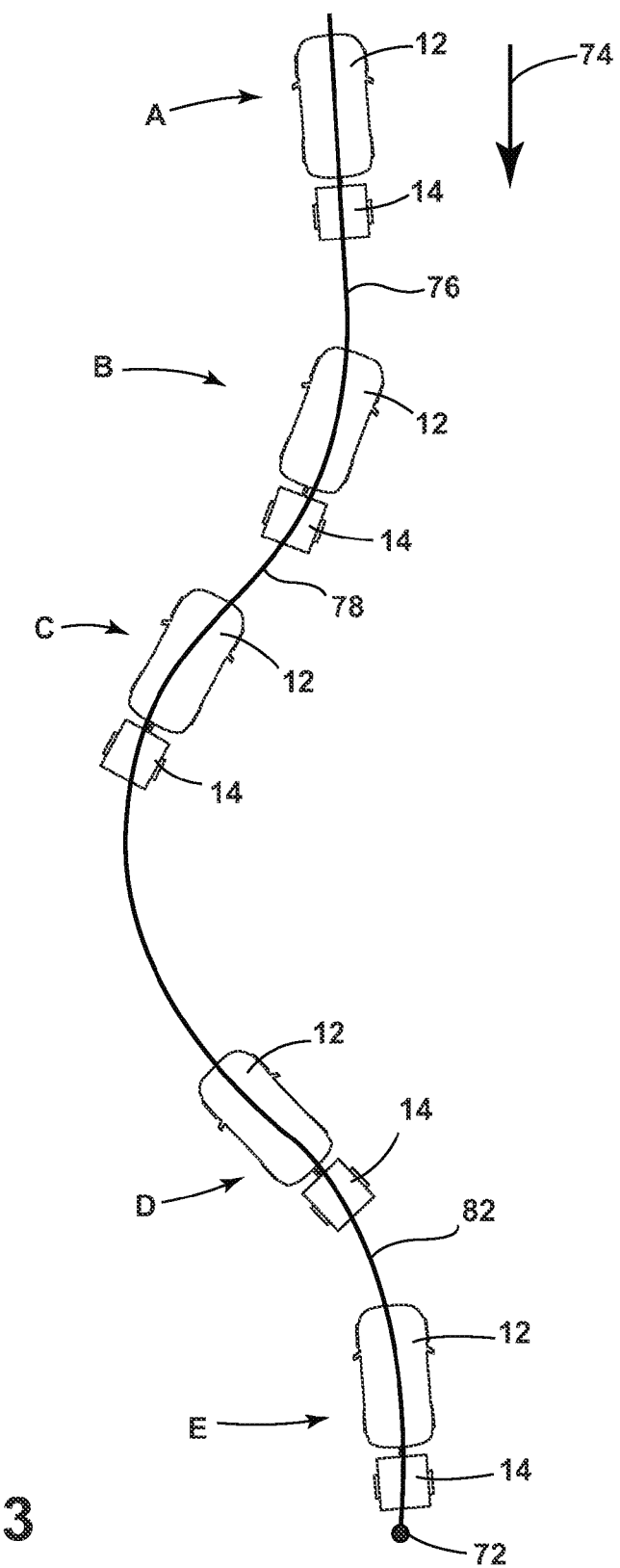
FIG. 3 illustrates an exemplary backing maneuver in which a vehicle and trailer deviate from an intended backing path followed by a correction for returning the vehicle and trailer to the intended backing path, according to one embodiment.

Referring to FIG. 3, an exemplary backing maneuver is shown with further reference to the guidance system 10 and steering icon 22 described in FIGS. 1 and 2, respectfully. The backing maneuver illustrates several instances of a vehicle 12 and trailer 14 being reversed toward a final parking spot 72. The backing maneuver begins at instance A, where the vehicle 12 and trailer 14 are in a substantially straight alignment. In the illustrated example, a straight backing maneuver is intended in the trailer heading specified by arrow 74. As the vehicle 12 and trailer 14 are reversed along path 76, the vehicle 12 and trailer 14 begin to deviate at instance B along path 78. As the vehicle 12 and trailer 14 begin to deviate, the controller 18 determines a steering direction and steering magnitude recommendation for correcting the deviation. The steering direction and steering magnitude recommendation may be displayed to the driver by the steering icon 22 generated on the display 16 of the vehicle 12. The steering direction and steering magnitude recommendation may be determined as a function of hitch angle information, global positioning information, vehicle and trailer-related properties, vehicle and trailer speed, or a combination thereof. In the illustrated embodiment, a first steering direction and steering magnitude recommendation may be made to the driver of the vehicle 12 at instance C prompting the driver to turn the steering device 23 (e.g., steering wheel) in a clockwise direction at a determined magnitude, which may be specified in degrees as described herein. The magnitude may depend on various factors such as, but not limited to, the speed in which the vehicle 12 and trailer 14 are traveling, vehicle 12 and trailer 14 related dimensions and properties, etc. At instance D, a second steering direction and steering magnitude recommendation may be made to the driver of the vehicle 12 prompting the driver to turn the steering device 23 in a counterclockwise direction at another determined magnitude to cause the vehicle 12 and trailer 14 to eventually straighten out along path 82. Once in a straight alignment on path 82, the driver may be notified hold indicator 70 to hold the steering device 23 in its current position so that the trailer 14 may be reversed along the desired heading to the final parking spot 72 (instance E). As the vehicle 12 and trailer 14 move toward the final parking spot 72 along path 82, the controller 18 may continue checking for deviations and the appropriate corrections can be made if necessary. While the intended backing path described above corresponds to a straight backing maneuver, it should be appreciated that steering direction and steering magnitude recommendations may also be made in instances where a driver is attempting a backing maneuver along a curved path. Furthermore, it is contemplated that steering direction and steering magnitude recommendations may also be made in instances where the vehicle 12 and trailer 14 are travelling in a forward direction.

Figure 4:
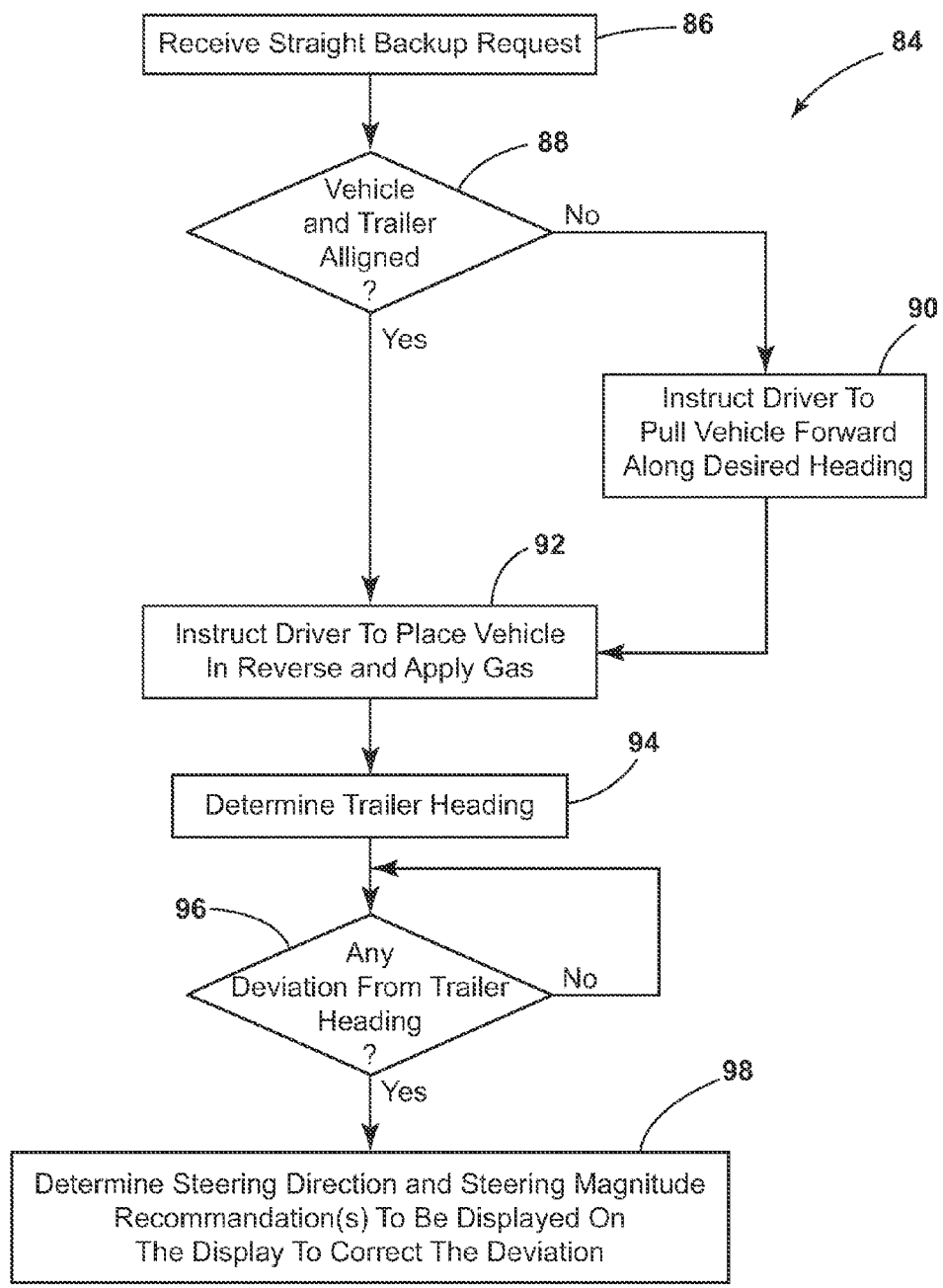
FIG. 4 is a flow diagram of a method for reversing a trailer attached to a vehicle along a straight backing path, according to one embodiment.

Referring to FIG. 4, a flow diagram of a method 84 for reversing a trailer 14 attached to a vehicle 12 along a straight backing path is shown according to one embodiment. The vehicle 12 is equipped with the guidance system 10 described herein and the method 84 may be executed by the controller 18 of the guidance system 10. For purposes of understanding, certain steps of the method 84 will be described with continued reference to elements appearing in FIGS. 1 and 2.

As shown in step 86, the controller 18 receives a straight backing request inputted by a driver or other user via the user-input device 58. In response, the controller 18 checks whether or not the vehicle 12 and trailer 14 are aligned at step 88 based on trailer angle information 38 received from the hitch angle detection device 26. If the vehicle 12 and trailer 14 are misaligned, the driver of the vehicle 12 may be instructed to pull the vehicle forward (step 90) in the desired heading until the vehicle 12 and trailer 14 are oriented in a straight alignment relative one another. Once it is determined that the vehicle 12 and trailer 14 are in a straight alignment (e.g., hitch angle λ equals approximately 0), the driver is instructed to place the vehicle 12 in reverse and apply gas to the vehicle 12 (step 92). As the vehicle 12 and trailer 14 begin to reverse, the controller 18 may determine a trailer heading at step 94. The determination of the trailer heading may be achieved through global positioning information or by other acceptable means. As the reversing of the trailer 14 continues, the controller 18 repeatedly checks for any deviation (step 96) from the trailer heading determined in step 94 based on hitch angle information 38 supplied by the hitch angle detection device 26. If the controller 18 finds that deviation has occurred, the controller 18 determines one or more steering direction and steering magnitude recommendations to be displayed on the display 16 of the vehicle 12 to correct the deviation (step 98). The steering direction and steering magnitude recommendation(s) may be determined according to any of the methods described herein. Should the driver of vehicle 12 decide to follow the steering direction and steering magnitude recommendations, the vehicle 12 and trailer 14 will be returned along the intended trailer heading.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A guidance system for a vehicle reversing a trailer, comprising:
    a display; and
    a controller configured to generate a steering icon on the display, wherein the steering icon recommends a steering direction and a steering magnitude related to a steering device of the vehicle in order to correct a deviation from an intended backing path.

2. The guidance system of claim 1, wherein the intended backing path comprises a straight backing path.

3. The guidance system of claim 1, wherein the controller determines the steering direction and the steering magnitude based on a measured hitch angle between the vehicle and the trailer.

4. The guidance system of claim 1, wherein the steering icon comprises a directional element indicating a direction in which to turn the steering device.

5. The guidance system of claim 4, wherein the directional element comprises a first arrow for indicating a counterclockwise turn of the steering device and a second arrow for indicating a clockwise turn of the steering device.

6. The guidance system of claim 4, wherein the steering icon further comprises a magnitude element indicating how far to turn the steering device in the direction indicated by the directional element.

7. The guidance system of claim 6, wherein the magnitude element comprises a numerical value measured in degrees.

8. The guidance system of claim 1, wherein the steering icon comprises a relating element to visually relate a current position of the steering device to the recommended steering direction and steering magnitude.

9. The guidance system of claim 1, wherein the steering icon comprises a hold indicator for instructing a driver of the vehicle to maintain the steering device at its current position.

10. A guidance system for a vehicle reversing a trailer, comprising:
    a display; and
    a controller configured to generate a steering icon on the display to recommend a steering direction and a steering magnitude related to a steering device of the vehicle to correct a deviation from an intended backing path, wherein the steering direction and the steering magnitude are determined at least in part based on a hitch angle between the vehicle and the trailer.

11. The guidance system of claim 10, wherein the intended backing path comprises a straight backing path.

12. The guidance system of claim 10, wherein the steering icon comprises a directional element indicating a direction in which to turn the steering device.

13. The guidance system of claim 12, wherein the directional element comprises a first arrow for indicating a counterclockwise turn of the steering device and a second arrow for indicating a clockwise turn of the steering device.

14. The guidance system of claim 12, wherein the steering icon further comprises a magnitude element indicating how far to turn the steering device in the direction indicated by the directional element.

15. The guidance system of claim 14, wherein the magnitude element comprises a numerical value measured in degrees.

16. The guidance system of claim 10, wherein the steering icon comprises a relating element to visually relate a current position of the steering device to the recommended steering direction and steering magnitude.

17. The guidance system of claim 10, wherein the steering icon comprises a hold indicator for instructing a driver of the vehicle to maintain the steering device at its current position.

18. A method of reversing a vehicle and trailer along an intended backing path, comprising the steps of:
    measuring a hitch angle between the vehicle and trailer;
    determining whether the vehicle and trailer have deviated from the intended backing path based on the measured hitch angle; and
    making a steering direction and steering magnitude recommendation on a display of the vehicle to correct a deviation from the intended backing path.

19. The method of claim 18, wherein the intended backing path comprises a straight backing path.

20. The method of claim 18, wherein the step of making a steering direction and steering magnitude recommendation further comprises the step of instructing a driver of the vehicle to maintain a steering device of the vehicle in its current position.

\* \* \* \* \*